US005213769A

United States Patent [19]
Whitlock

[11] Patent Number: 5,213,769
[45] Date of Patent: May 25, 1993

[54] MIXTURE FORMING METHOD AND APPARATUS

[76] Inventor: Walter H. Whitlock, 303 Forbush Mountain Dr., Chapel Hill, N.C. 27514

[21] Appl. No.: 784,826

[22] Filed: Oct. 30, 1991

[51] Int. Cl.[5] ........................ B01J 8/02; G01N 31/00; G01C 17/38

[52] U.S. Cl. ...................................... 422/212; 422/62; 422/110; 422/263; 422/288; 436/8; 436/9; 436/10; 436/174; 73/1 G; 34/80; 55/30; 55/33; 55/35

[58] Field of Search ................. 422/62, 110, 112, 115, 422/263, 285, 282, 288, 212; 436/8, 9, 10, 174, 179, 180, 181; 73/1 G; 137/266, 388; 34/80, 81; 55/343, 344, 350, 36, 35, 33

[56] References Cited

U.S. PATENT DOCUMENTS

| | | | |
|---|---|---|---|
| 3,721,253 | 3/1973 | Remke | 422/62 |
| 4,402,910 | 9/1983 | Smith et al. | 422/83 |
| 4,531,398 | 7/1985 | DiBenedetto et al. | 73/1 G |
| 4,636,225 | 1/1987 | Klein et al. | 55/35 |
| 4,832,711 | 5/1989 | Christel, Jr. et al. | 55/33 |
| 5,054,309 | 10/1991 | Mettes et al. | 73/1 G |
| 5,110,569 | 5/1992 | Jain | 55/33 |

OTHER PUBLICATIONS

Chambers Dictionary of Science and Technology, vol. 1, A/K, 1974, p. 115.
Webster's Ninth New Collegiate Dictionary, 1988, p. 682.
Tescom Pressure Controls Division Product Literature, Form No. 1656, 1990.

*Primary Examiner*—Robert J. Warden
*Assistant Examiner*—Christopher Y. Kim
*Attorney, Agent, or Firm*—David M. Rosenblum; Larry R. Cassett

[57] ABSTRACT

The present invention provides an apparatus for forming a mixture containing a regulated, low concentration of a target component within a carrier fluid. In accordance with the present invention, the carrier fluid is passed through the bed including a compound having two phases with one of the two phases containing the target component. A vapor phase of the target component exists within the bed in equilibrium with the target component contained within at least one of the two phases. The vapor phase has a partial pressure dependent upon bed temperature. The carrier fluid is then passed through the bed so that it contains the target component upon leaving the bed at essentially the partial pressure of the vapor phase. The target component concentration is dependent upon a quotient of the partial pressure of the vapor phase and carrier fluid total pressure. Regulation of the bed temperature and carrier fluid total pressure will in turn regulate the concentration of the target component within the carrier fluid. Additionally, concentration can be further regulated by diluting the mixture passing from the bed with additional carrier fluid. In such case, concentration will additionally be dependent upon a quotient of bed flow rate and total flow rate.

17 Claims, 1 Drawing Sheet

FIG.
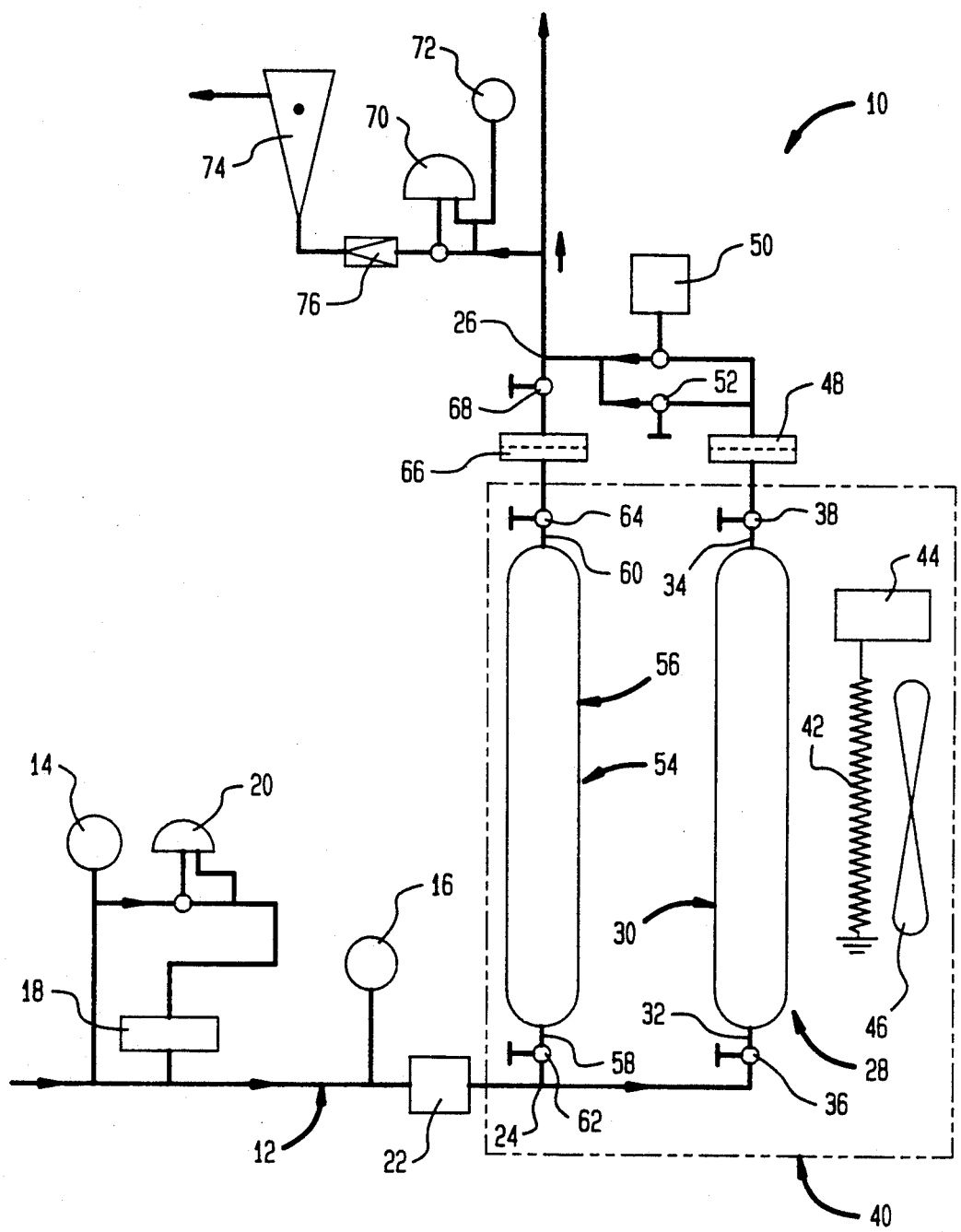

MIXTURE FORMING METHOD AND APPARATUS

BACKGROUND OF THE PRIOR ART

The present invention relates to a method and apparatus for forming a mixture containing regulated, low concentration of a target component within a carrier fluid. More particularly the present invention relates such a method and apparatus in which the mixture comprises a calibration gas formed of a nitrogen carrier fluid and a moisture target component present within the mixture in minute quantities.

Mixtures having regulated, low concentrations of a specific target component have many uses in the prior art. One important application of such mixtures is in the calibration of sensitive instruments used in assuring the purity of process gases and process equipment used in the manufacture of semiconductors. An important aspect of purity assurance in semiconductor manufacturing is the virtual elimination of moisture contamination which can decrease the manufacturing yield of semiconductors. Thus, process gases used in semiconductor manufacturing as well as the processing environment for semicondutors are tested to make certain that such manufacturing is carried out in an environment essentially free of moisture. This is accomplished testing equipment well known in the art, which before use, must be calibrated. Calibration is effected by exposing the testing equipment to nitrogen gas containing variable levels of moisture in very low concentrations.

Such calibration gases, which can comprise components other than nitrogen and moisture, are manufacturing by blending and diluting high concentration mixtures with a pure diluting gas. For instance, a mixture of nitrogen and moisture having a known, high concentration can be diluted with ultra high purity nitrogen to create a mixture of nitrogen and moisture in which the moisture is present within the mixture in fractions of parts per million. Such mixtures are created by permeation devices which themselves must be individually calibrated to account for differences arising from manufacturing tolerances. As can be appreciated, their manufacturing and use is accompanied by a high degree complexity and expense.

As will be discussed, the present invention provides a method and apparatus for forming a mixture containing a carrier gas and a regulated, low concentration of a target component without the expense and complexity involved in using prior art equipment which must be calibrated to accord for manufacturing differences between individual machines. It is to be mentioned that the present invention is not limited to the formation of calibration gases and as will become apparent to those skilled in the art, the present invention could be put to other uses. However, the present invention is readily adapted to manufacture calibration mixtures, and hence, will be discussed in relation to such use.

SUMMARY OF THE INVENTION

The present invention, in one aspect, provides a method of forming a mixture containing a regulated, law concentration of a target component within a carrier fluid. In accordance with such method the carrier fluid is passed through a bed including a compound having two phases. At least one of the two phases Contains the target component. A vapor phase of the target component exists within the bed in equilibrium with the target component contained within the at least one of the two phases The vapor phase has a partial pressure dependent upon bed temperature. The carrier fluid is passed through the bed so that upon flowing from the bed, it contains the target component at essentially the partial pressure of the vapor phase and at a concentration dependent upon a quotient of the partial pressure of the vapor phase and carrier fluid total pressure (the sum of the partial pressures of the vapor phase and the carrier fluid). The bed temperature can therefore be regulated and the carrier fluid total pressure can also be regulated so that the concentration of target component is the regulated, low concentration. As a result, the regulated mixture of the target component and carrier fluid is formed upon their flowing from the bed.

Such a process may used in forming a calibration gas. In such case, the bed can be formed of calcium sulfate and its chemical reaction can be expressed as:

If nitrogen containing an arbitrary the amount of moisture is passed through the bed, at a sufficiently low velocity, the partial pressure of the moisture in the a nitrogen will be adjusted to essentially equal the partial pressure of the moisture existing as the vapor phase within the bed. If the nitrogen being passed through the bed contains moisture at a higher partial pressure than the vapor phase of moisture existing within the bed, the bed will take the excess moisture into the solid phase. Conversely, if the entering nitrogen contains moisture at a lower partial pressure than the vapor phase of moisture within the bed, moisture will taken from the solid phase and mixed into the flow of nitrogen passing through the bed. In both situations, the concentration of the moisture within the nitrogen leaving the bed will be set by a quotient of the partial pressure of the vapor phase of moisture existing within the bed and the pressure of the nitrogen flowing through the bed. As will be discussed, the partial pressure of the vapor phase of moisture within the bed is a function of bed temperature. Hence, regulation of the bed temperature and the total pressure of the nitrogen gas will closely regulate the concentration of moisture within the nitrogen leaving the bed Other carrier fluid and target component combinations are possible with the present invention. For instance, in the example given above, in place of nitrogen, alcohol could be passed through such a bed to produce an alcohol and water mixture having a regulated, low concentration of water.

Additionally, another possible combination is given by the following reaction:

This reaction generates a gas phase of an oxygen component by decomposition of a solid phase peroxide The oxygen concentration of the gas phase is varied by changing the temperature.

A still further reaction to generate a hydrogen containing mixture is given by the following formula:

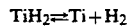

Even lower concentration mixtures of carrier fluid and target component can be formed by diluting the all ready low concentration mixture flowing from the bed. In accordance with this aspect of the present invention, the carrier fluid is passed through a bed comprising a compound having two phases, with at least one of the two phases containing the target component. A vapor phase of the target component exists within the bed in equilibrium with a target component contained within the least one of the two phases. The vapor phase has a partial pressure dependent upon bed temperature. The carrier fluid is passed through the bed so that upon flowing from the bed, it contains the target component at essentially the partial pressure of the vapor phase and at a concentration dependent upon a quotient of the partial pressure of the vapor phase and carrier fluid total pressure. The carrier fluid flowing from the bed is then diluted with additional carrier fluid such that the concentration of the target component after dilution is additionally dependent upon a quotient of a bed flow rate of the carrier fluid through the bed and a total flow rate equal to a sum of a flow rate of the additional carrier fluid and the bed flow rate. It is appropriate to point out that part of the bed flow rate could be shunted off and not used in forming the mixture. Thus, the term "bed flow rate⇌ as used herein and in the claims means the actual bed flow rate contributing to the formation of the mixture. The bed temperature can then be regulated along with the carrier fluid total pressure and total and bed flow rates can be metered such that the carrier fluid contains a target component at a regulated, low concentration after having been diluted.

In another aspect, the present invention provides an apparatus for forming a mixture containing a regulated, low concentration of a target component with a carrier fluid. The apparatus comprises a bed having an inlet and an outlet. The bed includes a compound having two phases with at least of one of two phases containing the target component. A vapor phase of the target component exists within the bed in equilibrium with the target component contained within the at least one of the two phases. The vapor phase has a partial pressure dependent upon bed temperature. The carrier fluid is adapted to be passed through the bed, into the inlet and from the outlet, such that upon reaching the outlet of the bed, it contains the target component at essentially the partial pressure of the vapor phase and at a concentration dependent upon a quotient of the partial pressure of the vapor phase and carrier fluid total pressure. A Pressure control means is connected to the inlet for controlling the carrier fluid total pressure such that the concentration of the target component contained within the carrier fluid is the regulated concentration. As a result, the mixture of the target component and the carrier fluid is formed at the outlet of the bed.

Additionally, the present invention also provides an apparatus incorporating a bed, such as described above, with the addition of a branched flow path for the carrier fluid. The branched flow path has an entry leg and primary and secondary legs branching off from the entry leg at a first junction and rejoining one another at a second junction. Here, it should be pointed out that the terms "primary⇌ and "secondary⇌ are arbitrary terms that are used for the sake of convenience. In practice however, for reasons that will become apparent, in the most common use of the present invention, the major portion of the carrier fluid will flow through the primary leg of the branched flow path.

The bed forms the secondary leg of the branched flow path such that the carrier fluid flowing from the bed is diluted with additional carrier fluid flowing in the primary leg of the branched flow path. The concentration of the target component after dilution will therefore be additionally dependent upon a quotient of a bed flow rate of the carrier fluid through the bed and a total flow rate equal to a sum of a flow rate of the additional carrier fluid and the bed flow rate.

Pressure control means are located within the entry leg of the branched flow path for controlling the carrier fluid total pressure. Total flow registering means are provided for registering the total flow within the entry leg. First and second metering means are located with the primary and secondary legs of the branched flow path, respectively, for metering the flow rate of the additional carrier fluid and the bed flow rate. As a result, at a constant, predetermined bed temperature, the mixture can be formed at the second junction by controlling the carrier fluid total pressure and the total and bed flow rates.

BRIEF DESCRIPTION OF THE DRAWING

While the specification concludes with the claims distinctly pointing out the subject matter that applicant regards as his invention, it is believed that the invention will be better understood when taken in connection with the accompanying sole figure which is a schematic of an apparatus used in carrying out the present invention.

DETAILED DESCRIPTION OF THE INVENTION

With reference to the figure, an apparatus 10 in accordance with the present invention is illustrated that is specifically designed to produce a mixture comprising a carrier gas of nitrogen containing a target component of moisture in variable low level concentrations.

Nitrogen enters apparatus 10 through an entry leg 12 containing a source pressure gauge 14 for registering the pressure of the nitrogen at its source. Pressure within an entry leg 12 is registered by an inline pressure gauge 16. Both source and inline pressure gauges 14 and 16 are capable of registering pressure in an approximate range of between 0 and 100 psi. Pressure is controlled within entry leg 12 by a dome loaded pressure regulator 18. Such a pressure regulator is used because it can be manufactured to be completely compatible with high purity applications. However, it does require a reference pressure. Such reference pressure is provided by an instrument grade pressure regulator 20. This pressure regulator is capable of holding a constant pressure but it is not compatible with high purity gas systems and as such is connected to dome loaded pressure regulator 18 to simply set its reference pressure. The total flow rate of nitrogen within entry leg 12 is registered by a thermal type mass flow indicator 22.

Entry leg 12 comprises one of three legs of a branched flow path. The branched flow path contains primary and secondary legs, which will be described in more detail hereinafter, branching off from entry leg 12 at a first junction 24 and rejoining one another at a second junction 26. In the most common practice of the present invention, as has been discussed above, the major portion of the nitrogen will flow in the primary leg.

The secondary leg is formed by a bed 28. Bed 28 is contained within a cylinder 30 having an inlet 32 and an outlet 34. Bed 28 can be isolated by a pair of inlet and outlet cutoff valves 36 and 38. Bed 28 contains approximately 0.5 liters of calcium sulfate, preferably non-indicating DRYERITE, mesh #10-20, manufactured by W. A. Hammond Dryerite Company, P.O. Box 460, Xenia, Ohio 45385. Although not illustrated, the calcium sulfate is held within cylinder 30 between two screens near inlet 32 and outlet 34, respectively. Bed 28 is prepared by first fully hydrating the calcium sulfate. This is accomplished by spreading the calcium sulfate on a tray into a layer of about 6.35 mm. thick and exposing it to the ambient air for about 24 hours. During such exposure, the calcium sulfate is covered with filter paper. Thereafter, cylinder 30 is filled and inlet and outlet cutoff valves are installed. A flow of dry gas is then passed through cylinder 30, through inlet 32 and out of outlet 34, at a flow rate of about 4 to 5 liters per minute for about a week or two. The moisture content of the flow passing from bed 28 is monitored and when stable, is compared with a flow from a previously prepared cylinder that has been similarly run for about a year. When no difference in moisture content is observed, it is known that absorbed impurities have been removed from the bed and also, that the bed is partially hydrated and contains two solid phases. It is important to note that the bed must then be used so that the flow passes through the bed in the same direction as the flow used in preparing the bed. One of the solid phases contains water in accordance with the formula $CaSO_4 \cdot \frac{1}{2}H_2O$. The water existing within this solid phase is in equilibrium with water in a vapor phase. The other of the solid phases may be completely dehydrated or in fact it may contain water and calcium sulfate in some other molar proportion.

Bed 28 is then calibrated. Normally such calibration is carried out with the bed held at a controlled temperature of approximately 25° C. Ultra high purity dry nitrogen gas is then passed through the bed and then through a 5/8 inch outer diameter copper tube approximately 20 inches long contained within a constant temperature bath machine, which is well known in the art. From the copper tube, the gas flows through a stainless steel filter and a model System II moisture probe manufactured by Panametrics Inc. of 221 Crescent Street, Waltham, MA 02254. Thereafter, the flow is conducted through a flow meter. The bath machine is then cooled while moisture is measured by the probe. At some point, there will appear a fall off in moisture content as indicated by a decreasing probe signal. This "fall off" point is the dew point temperature at which an equilibrium exists between the solid and vapor phases of the water contained within the nitrogen flow. The partial pressure of the water within the flow, and therefore within the bed, is a well known function of this dew point temperature and as such, will become a known quantity at a bed temperature of approximately 25° C.

This vapor phase pressure will remain constant so long as bed 28 is used at about 25° C. (or for that matter whatever temperature bed 28 is calibrated). In most practical applications of the present invention, the bed temperature of bed 28 is maintained constant within a temperature controlled cavity indicated by dashed line 40, and a heater 42 coupled to a temperature controller 44. Ambient air is blown through temperature controlled cavity 40 by a motorized fan 46.

The flow of the nitrogen moisture mixture then passes into a model 55-4FW-0.5 all metal filter 48 manufactured by Nupro Co. of 4800 East 345th Street, Willoughby, Ohio 44094 which is used to filter any small particles of bed 28 passing from cylinder 30. Thereafter, the mixture can flow into two sub-branches formed by a mass flow controller 50 and a needle valve 52 located near second junction 26. With needle valve 52 closed, mass flow controller 50 will provide flow rates of approximately 20 cc per minute. It is used when the mixture flowing from bed 28 is to be formed with a very low concentration of moisture. Alternatively, needle valve 52 can be opened in case high concentration mixtures are to be produced by bed 28.

The mixture flowing from bed 28 can be diluted by nitrogen flowing through a primary leg of the aforementioned branched flow path formed by a bed 54 containing approximately 0.5 liters of activated alumina A-2, 12-32 mesh, manufactured by La Roach Chemical Company, P.O. Box, 1031 Baton Rouge, LA 70812), within a cylinder 56. Cylinder 56 is approximately 35 cm long and 5 cm in diameter and is provided with an inlet 58 and an outlet 60. Cylinder 56 can be isolated by inlet and outlet cutoff valves 62 and 64. An all metal filter 66, identical in construction to filter 48, can be used to filter out any small particles of alumina passing from cylinder 56. The flow within such primary leg is controlled by a needle valve 68. Since the flow in the primary leg can either be adjusted by flow controller 50 or needle valve 52, adjustment of needle valve 68 will in turn control not only the flow rate in the primary leg of the branched flow path but also the total flow rate through apparatus 10. As mentioned previously needle valve 52 is opened to produce mixtures having high concentration of moisture. In such case needle valve 68 is closed.

As can be appreciated from the above discussion concerning the shut off of needle valve 68 and the opening of needle valve 52 to create higher concentration mixtures, a possible embodiment of the present would not include a primary leg to dilute the mixture flowing from bed 28 within the secondary leg. In such case, concentration could be controlled solely by the temperature of bed 28 and the pressure of entering nitrogen.

From second junction 26, the nitrogen and moisture mixture can then be used as a calibration gas. The actual process equipment to be calibrated by the formed calibration gas may have a very specific flow rate requirement which is not the flow rate of nitrogen passing through apparatus 10. For such reason a back pressure controller 70 is provided which is set with reference to a pressure gauge 72 having an approximate scale range of 0 to 50 psi. Any excess pressure of the nitrogen and moisture mixture would be vented through variable area flow meter 74 to sense flow rate. A check valve 76 is provided to prevent atmospheric ambient from entering apparatus 10 when not in use.

As as example of the use of the apparatus 10, nitrogen having an inlet pressure measured by pressure gauge 14 of about 80.0 psi was supplied to apparatus 10. Instrument grade pressure regulator 20 was then set so that the gas pressure in primary leg 12 was approximately 60.0 psi. The bed was previously calibrated by the method described above to contain a vapor phase at a partial pressure of approximately $1.5 \times 10^{-6}$ torr at 20° C. Flow controller 50 was then set to produce a flow rate of 100.0 sccm within secondary leg and needle valve 68 was set to produce a mass flow rate, as indicated by thermal type mass flow indicator 22 of approximately 1000.0 sccm. The result was that a calibration gas was created containing approximately 1.53 parts per million moisture. As can be appreciated, suitable adjustment of mass flow controller 50 was then used to adjust the moisture content of the calibration gas to other low moisture concentrations.

While the invention has been shown and described with reference to a preferred embodiment, as will occur to those skilled in the art, numerous additions and changes can be made with that departing from the spirit and scope of the present invention.

I claim:

1. A method of forming a mixture of a carrier fluid and a target component, the mixture containing a regulated concentration of the target component within the carrier fluid, said method comprising:

passing the carrier fluid through a bed including, a compound and a vapor phase of the target component, the compound having two phases, at least one of the two phases containing the target component, the vapor phase of the target component existing within the bed in equilibrium with the target component contained within the at least one of the two phases, and the vapor phase having a partial pressure dependent upon bed temperature;

the carrier fluid being passed through the bed so that upon flowing from the bed, the carrier fluid contains the target component at essentially the partial pressure of the vapor phase and at a concentration dependent upon a quotient of the partial pressure of the vapor phase and carrier fluid total pressure; and regulating the bed temperature and the carrier fluid total pressure so that the concentration of the target component is the regulated concentration and thus, the mixture of target component and carrier fluid is formed upon their flowing from the bed.

2. A method of forming a mixture of a carrier fluid and a target component, the mixture containing a regulated concentration of the target component within the carrier fluid, said method comprising:

passing the carrier fluid through a bed including, a compound and a vapor phase of the target component, the compound having two phases, at least one of the two phases containing the target component, the vapor phase of the target component existing within the bed in equilibrium with the target component contained within the at least one of the two phases, and the vapor phase having a partial pressure dependent upon bed temperature;

the carrier fluid being passed through the bed so that upon flowing from the bed, the carrier fluid contains the target component at essentially the partial pressure of the vapor phase and at a concentration dependent upon a quotient of the partial pressure of the vapor phase and carrier fluid total pressure; and diluting the carrier fluid flowing from the bed with additional carrier fluid such that the concentration of the target component after dilution is additionally dependent upon a quotient of a bed flow rate of the carrier fluid through the bed and a total flow rate equal to a sum of an additional flow rate of the additional carrier fluid and the flow rate of the carrier fluid; and regulating the bed temperature, the carrier fluid total pressure and metering the total and the bed flow rates such that the carrier fluid contains the target components the the regulated concentration after being diluted.

3. The method of claim 2, further comprising:

forming the carrier fluid into an entry stream having the total flow rate;

dividing the entry stream into a primary stream flowing at the additional flow rate of the additional carrier fluid and a secondary stream flowing at the bed flow rate of the carrier fluid;

passing the secondary stream through the bed;

combining the primary stream with the secondary stream after leaving the bed; and metering the primary and secondary streams to meter the total and bed flow rates.

4. The method of claim 2, wherein:

the carrier fluid and the additional carrier fluid comprises a gas;

the target component comprises moisture; and the bed is formed from $CaSO_4$; and the method further comprises removing essentially all moisture contained within the additional carrier fluid by passing the the additional carrier fluid through an additional bed formed from Alumina.

5. The method of claim 3, wherein:

the carrier fluid and the additional carrier fluid comprises a gas;

the target component comprises moisture; and the bed is formed from $CaSO_4$; and the method further comprises removing essentially all moisture contained within the additional carrier fluid by passing the the secondary stream through an additional bed formed from Alumina.

6. An apparatus for forming a mixture of a carrier fluid and a target component, the mixture containing a regulated concentration of the target component within the carrier fluid, said apparatus comprising:

a bed and bed containing means for containing the bed, the bed comprising, a compound and a vapor phase of the target component, the compound having two phases, at least one of the two phases containing the target component, the vapor phase of the target component existing within the bed in equilibrium with the target component contained within the at least one of the two phases, and the vapor phase of the target component having a partial pressure dependent upon bed temperature;

the bed containing means having an inlet and an outlet;

the carrier fluid adapted to be passed through the bed, into the inlet and from the outlet, such that upon reaching the outlet of the bed containing means, the carrier fluid contains the target component at essentially the partial pressure of the vapor phase and at a concentration dependent upon a quotient of the partial pressure of the vapor phase and carrier fluid total pressure; and pressure control means connected to the inlet of the bed containing means for controlling the carrier fluid total pressure such that the concentration of the target component is the regulated concentration and thus, the mixture of the target component and carrier fluid is formed at the outlet of the bed containing means.

7. An apparatus for forming a mixture of a carrier fluid and a target component, the mixture containing a regulated concentration of the target component within the carrier fluid, said apparatus comprising:

a bed and bed containing means for containing the bed, the comprising, a compound and a vapor phase of the target component, the compound having two phases, at least one of the two phases containing the target component, the vapor phase of the target component existing within the bed in equilibrium with the target component contained within the at least one of the two phases, and the vapor phase of the target component having a partial pressure dependent upon bed temperature;

the bed containing means having an inlet and an outlet;

the carrier fluid adapted to be passed through the bed containing means, the carrier fluid contains the target component at essentially the partial pressure of the vapor phase and at a concentration dependent upon a quotient of the partial pressure of the vapor phase and carrier fluid total pressure;

a branched flow path for the carrier fluid having an entry leg and primary and secondary legs branching off from the entry leg at a first junction and the primary and secondary legs rejoining at a second junction, the bed containing means forming the secondary leg of the branched flow path such that the carrier fluid flowing from the bed is diluted with additional carrier fluid flowing in the primary leg of the branched flow path and the concentration of the target component after dilution is additionally dependent upon a quotient of a bed flow rate of the carrier fluid flowing in the secondary leg and a total flow rate equal to a sum of an additional flow rate of the additional carrier fluid and the bed flow rate pressure control means located within the entry leg of the branched flow path for controlling the carrier fluid total pressure;

first metering means located within the primary leg for metering the flow rate of the additional carrier fluid;

second metering means located within the secondary leg for metering the bed flow rate; and total flow registering means located within the entry leg for registering the total flow within the entry leg, whereby at a constant, predetermined bed temperature, the mixture can be formed at the second junction by controlling the carrier fluid total pressure and the total and bed flow rates.

8. The apparatus of claims 6 or 7, wherein:
the compound comprises $CaSO_4$
the target component comprises moisture; and
the carrier fluid comprises a gas.

9. The apparatus of claim 7, wherein:
the compound comprises $CaSO_4$
the target component comprises moisture;
the carrier fluid and additional carrier fluid comprises a gas; and
the primary leg contains an additional bed of alumina to remove essentially all moisture from the gas forming the additional carrier fluid.

10. The apparatus of claim 7, wherein:
the first metering means comprises a first needle valve near the second junction; and
the second metering means comprises as mass flow controller in parallel with a second needle valve located between the outlet of the bed containing means and the second junction, whereby with the second needle valve closed, the mass flow controller is operable to set the bed flow rate and the first needle valve is operable to set the total flow rate and alternatively, the first needle valve can be closed so that the flow rate of the additional carrier fluid is non-existent and the second needle valve can be used to set the total flow rate and the bed flow rate.

11. The apparatus of claim 7, wherein the pressure control means comprises:
a pair of first and second pressure gauges to register source pressure and carrier fluid total pressure, respectively;
a dome loaded pressure regulator to regulated pressure in accordance with a reference pressure; and
an instrument gauge pressure regulator connected to the dome loaded pressure regulator to set the reference pressure.

12. The apparatus of claim 7, further comprising back flow regulator means connected to the second junction downstream of the primary and secondary leg as for regulating back pressure.

13. The apparatus of claim 7, further comprising temperature control means for maintaining the predetermined temperature constant.

14. The apparatus of claim 9, wherein:
the first metering means comprises a first needle valve near the second junction; and
the second metering means comprises a mass flow controller in parallel with a second needle valve located between the outlet of the bed containing means and the second junction, whereby with the second needle valve closed, the mass flow controller is operable to set the bed flow rate and the first needle valve is operable to set the total flow rate and alternatively, the first needle valve can be closed so that the flow rate of the additional carrier fluid is non-existent and the second needle valve can be used to set the total flow rate and the bed flow rate.

15. The apparatus of claim 14, wherein the pressure control means comprises:
a pair of first and second pressure gauges to register source pressure and carrier fluid total pressure, respectively;
a dome loaded pressure regulator to regulate pressure in accordance with a reference pressure; and
an instrument gauge pressure regulator connected to the dome loaded pressure regulator to set the reference pressure.

16. The apparatus of claim 15, further comprising back flow regulator means connected to the second junction downstream of the primary and secondary leg for regulating back pressure.

17. The apparatus of claim 16, further comprising temperature control means for maintaining the predetermined temperature constant.

* * * * *